Patented Oct. 23, 1934

1,978,171

UNITED STATES PATENT OFFICE 1,978,171

PROCESS FOR PRODUCING VEGETABLE EXTRACT AND JUICE AND PRODUCT THEREOF

John B. Rolle, Chicago, Ill.

No Drawing. Application February 6, 1932
Serial No. 591,461

7 Claims. (Cl. 99—11)

My invention relates generically to the production of extract and juice from vegetables generally which are susceptible to the steps of treatment below described, by which either a liquid extract of the vegetable may be produced, or, if desired, a more concentrated solution of the essential parts of the vegetable may be produced, which to distinguish from the vegetable extract, I designate as vegetable juice.

My invention has for its purpose, the production of extract or juice from herbal vegetables generally, and particularly from vegetables of that classification that deteriorate to a greater or lesser degree when the attempt is made to keep them a substantial time after they are ripe, before using them, or where it is desired to have the benefits and advantages of any such vegetable under conditions practically preventing the keeping of said vegetable in good condition. The extract or juice produced by my invention is stable, it contains all of the characteristic elements of the vegetable from which it is made with very little additional fixing material, which is entirely harmless, and it may be used at any later time to impart the characteristics of the vegetable from which it is made, to any desired food stuff.

I am aware that plant or vegetable growth generally includes within its classification trees such as fruit trees and nut bearing trees, many of which fruits and nuts are valuable as food, and I do not claim that my present invention has commercial value in connection with such fruits and nuts. To distinguish from such trees, I employ the term herbal vegetables in the present application to designate generally any and all forms of plants, which grow in or on the ground and which are adapted in any way for use as food stuffs or in connection with food stuffs. Herbal vegetables so defined, may for convenience be divided into four groups as follows: first, leaf and stem vegetables or so called greens, for example, spinach, celery, parsley and asparagus; second, fruit bearing vegetables, for example, onions and garlic; third, tuber vegetables, for example potatoes, carrots, turnips and beets; and fourth, vegetables used principally if not solely for their flavor, for example mint and basil. Any and all of such herbal vegetables are susceptible of treatment by my present process, and the extract or juice produced by my process from any of said vegetables, possesses all of the essential elements and characteristics of the vegetable from which it is produced, in stable form that will not undergo appreciable change for a long period of time, and that contains the essential elements and characteristics of the vegetable to a sufficient degree to make it quite as effective for use in preparing food stuffs as though the vegetable itself were so used, whether the food stuff is prepared for immediate use, for example, in the home, or as a manufactured product for sale as such and for subsequent use.

It is well known that many fresh herbal vegetables must be used promptly after they are removed from the ground, since they begin to decay quickly after such removal; it is also well known that vegetables of the kind referred to, frequently are partly or wholly diseased; and regardless of the keeping qualities of these vegetables, and their susceptibility to or freedom from disease, it is difficult to keep them without deterioration for any appreciable length of time, particularly where certain temperatures must be closely adhered to, and particularly also where the vegetables are bulky and require a large amount of space to contain them. All of these difficulties are overcome by my present invention, by which an extract or a juice of any desired one of these vegetables may be produced that can be conveniently kept without deterioration of any kind for a long time interval, and in containers permitting the storing of a large quantity of the product in a relatively small space.

My improved process consists essentially of mixing subdivided and cleaned portions of the fresh herbal vegetables which are free from disease, with water and fixed or stable oil, the latter preferably being a vegetable oil, for example, corn oil, olive oil, linseed oil or cottonseed oil, in a still and subjecting the mixture to sufficient heat to draw out the essential oil or essence of the vegetable and mix it with the liquid in the still, and delivering from the still, vapor from the liquid in the still, into a condensing chamber where the vapor forms a liquid condensate containing a part of the essential oil or essence of the vegetable, this operation being continued preferably until the condensate amounts to a substantial portion of the original volume of the liquid in the still, for example one-third thereof. The condensate thus formed, is the flavor or extract of the vegetable, and consists of part of the essential oil or essence of the vegetable in solution in the liquid of the condensate, including a sufficient amount of the added fixed oil to retain the essential oil or essence of the vegetable in the condensate, in stable condition. Where the temperature applied to the still is properly maintained, depending upon the particular vegetable being treated, and the treatment is continued for a sufficient interval, for example to produce a volume of the condensate substantially one-third as great as the combined original volume of the fixed oil and water in the still, I find that the amount of the added fixed oil present in the condensate is very small, for example not to exceed at the most, one to two per cent of the condensate, and usually much less than that amount; and I further find for reasons I am unable to determine, that the liquid remaining in the still and containing a considerable amount of the essential oil or essence of the vegetable is in blended condition, that the water and the fixed oil in the still no longer separate as they did when placed therein, that the amount of free fixed oil remaining in the still is quite small, and that the total volume of the liquid remaining in the still plus the volume of the condensate is substantially equal to the combined volume of water and fixed oil placed in the still at the beginning of the operation. The essential oil or essence of the vegetable is naturally volatile and this accounts for the decrease in quality and strength of the vegetable when it is kept as such, after being removed from the ground. Apparently, the essential oil or essence drawn from the vegetable by the heating of the mixture in the still, combines with the fixed oil in the still, with the two-fold effect that the essential oil is retained in the liquid by the fixed oil and held thereby in stable and unchanged condition for a long time, and that the fixed oil by the action of the essential oil or essence upon it, is caused to intimately mix with the water of the solution, or possibly to dissolve in said water, for I find practically no free oil in the condensate, even after it has been kept for a long time interval.

In preparing what I call the juice of the herbal vegetable, I take the liquid extract of the vegetable prepared as described, mix it with a fresh quantity of cleaned and subdivided portions of the vegetable which are free from disease, place the mixture in a suitable receptacle, tightly cover the same, and permit it to stand, for example, for twenty-four hours, after which I remove the entire mixture from the said receptacle and by means of a press, remove all of the liquid portion of the mixture from the solid portions of the vegetable, that can be so removed without separating the fiber of the solid portion of the vegetable and passing it into the liquid delivered from the press, after which the liquid portion delivered from the press is filtered, for example, through several thicknesses of cheesecloth or other filtering material, and the liquid thus secured is the juice of the vegetable. I find that the treatment last described has the effect of drawing from the vegetable, substantially all of its essential oil or essence and all of its soluble elements, such as mineral salts, and that the vegetable juice has a degree of concentration such that it is the equivalent, as far as the characteristic elements of the vegetable are considered, of an equal weight of the fresh and untreated vegetable itself. The vegetable juice thus formed is effective for use in preparing any desired food stuffs, whether for immediate use or as manufactured products for sale and subsequent use, or it may be used as such, either as a medicine or a food. While I have not been able to determine the reason for the action, the vegetable extract above described, as a result of containing the essential oil or essence of the vegetable as described, appears to have an affinity for the essential oil or essence of the vegetable during the production of the vegetable juice, which may account for the marked increase of strength or concentration of the vegetable juice over the strength of the vegetable extract, and the fixed oil contained in the vegetable extract appears to have the property of retaining the essential oil or essence of the vegetable in the vegetable juice in stable and unchanged condition for a long period of time, for I find that the vegetable juice made as described, maintains its strength and efficiency for many months, and without apparent deterioration or change of any kind, having at all times the characteristics and properties of the fresh and healthy vegetable.

While my improved process described is generic and applicable generally to herbal vegetables as above defined, I here described the specific application of my said process to celery, one of said leaf and stem vegetables, as illustrative of my said process.

In two copending applications for United States Letters Patent filed heretofore by me, I claim specifically in one thereof the steps of treatment of onions to produce onion extract and juice and the products resulting therefrom, and in the other thereof the steps of treatment of garlic to produce garlic extract and garlic juice and the products resulting therefrom, reserving for the subject matter of the present patent application, the application of my process generically to herbal vegetables to produce extracts and juices therefrom, and specifically the treatment of celery to produce celery extract and celery juice, as well as the products resulting therefrom.

In making celery extract, a certain quantity of celery stalks are weighed out, for example ten pounds, care being taken that all of the stalks are free from disease and that they are fresh so that they contain the natural ingredients of healthy celery stalks, the stalks are separated and carefully cleaned and then cut or chopped and bruised so that the liquid employed may come intimately into contact with the subdivided portions of the celery. The subdivided portions of the celery stalks are then placed in a still and then a fixed oil, for example, corn oil, and water are added, the quantity of corn oil being preferably one gallon and of water preferably two gallons, and then the still is heated to, for example, from 120° F. to 220° F. to extract the essential oil from the celery and vaporize a portion of the contents of the still, the vapor being led into a suitable condensing chamber and there condensed to form the celery flavor or extract. This operation is preferably continued until the condensate has a volume of substantially one gallon. As stated above, the celery extract may be used as such, or in connection with food stuffs, or it may be used as a solvent in making the celery juice.

To make the celery juice, fresh celery stalks are weighed out, for example eight pounds of said stalks being taken, which are clean and free from disease, this quantity of stalks is then cut or chopped and bruised and together with the celery extract resulting from the treatment of the proceeding batch of celery stalks, is placed in a suitable container, for example a five gallon jar. The container is then tightly covered and allowed to stand in a cool temperature for example below 60° F. for preferably about twenty-four hours. The contents of the container are then removed and placed in a press by which all of the liquid in the subdivided portions of the celery stalks is pressed out that can be separated without carrying the fiber of the stalks into the liquid, and the liquid is preferably strained through a suitable filter, for example, several thicknesses of cheesecloth, to eliminate all particles of solid matter from the strained liquid. The strained liquid constitutes the celery juice and has a strength substantially equal to the same weight of fresh raw celery and contains all of the essential elements and mineral salts of and has the same properties as the fresh raw celery.

It will be understood that each herbal vegetable contains characteristic ingredients, and that where such a vegetable has a distinctive odor and flavor it is generally due to an essential oil or essence contained in the vegetable when it is fresh. This is true in connection with celery, the main constituents of its essential oil being terpine, phenols, lactone, limonene, sedanodic and sedanolic acids. This essential oil undergoes no change while it is in the growing vegetable and is found in unchanged condition in the fresh vegetable after it is removed from the ground, but unless the fresh celery is quickly used, the essential oil is volatilized and this produces a marked change in the condition of the celery, not only as to its taste, but also as to its food and medicinal values. The characteristic effect of celery as a food is well known, and by reason of the apiol which it contains, its therapeutic value is highly regarded by the medical profession, it being found that celery when fresh is very useful in treating digestive troubles and nervous disorders. Fresh celery is also known to contain vitamins A, B and C which are effective in correcting rachitic conditions, nervous disorders and scurvy and allied diseases, making celery a desirable article of food, quite apart from the pleasantness of its taste.

In carrying out my invention it will be understood that the proportions of the herbal vegetable, fixed oil and water used in different cases, as well as the times and temperatures employed, may be changed according to the vegetables treated and the results desired. I do not therefore limit myself to the particular proportions, materials and times of treatment described, as I consider that my invention includes and covers not only the particular steps and times of treatment above described, but also any modifications thereof that will produce substantially the results above described, both specifically and generically in connection with herbal vegetables as above defined, and that my invention also includes the product or products resulting from my said process.

What I claim is:

1. The process of making liquid extract of herbal vegetables other than bulbs of the group of garlic and onions, consisting of cleaning and subdividing a quantity of the vegetable, mixing it with water and a fixed oil in a still, heating the mixture to from 120° F. to 220° F. and thereby vaporizing a portion of the water and of the fixed oil, and condensing the said vaporized portions to form the extract.

2. The process of making liquid extract of herbal vegetables other than bulbs of the group of garlic and onions, consisting of mixing the vegetable in subdivided condition with water and a fixed oil, and extracting the essence of the vegetable in the presence of the fixed oil.

3. The process of making juice of herbal vegetables, consisting of first making an aqueous solution of a fixed oil and the essence of a first quantity of the vegetable, and then by means of said solution as a solvent extracting the parts of a second quantity of the vegetable soluble in said solvent.

4. The process of making juice of herbal vegetables, consisting of first making a solution of water, a fixed oil and the essence of a first quantity of the vegetable at a temperature of from 120° F. to 220° F., and then dissolving in said solution at a temperature of less than 60° F. the soluble parts of a second quantity of the vegetable including the essence and mineral salts thereof.

5. The process of making celery extract, consisting of mixing subdivided celery stalks with water and a fixed oil, heating the mixture and vaporizing a portion of the liquid thereof, and condensing the said vaporized portion to form the extract.

6. The process of making celery extract, consisting of mixing subdivided celery stalks with water and a fixed oil, heating the mixture to from 120° F. to 220° F. and vaporizing a portion of the liquid thereof, and condensing the said vaporized portion to form the extract.

7. The process of making celery juice, consisting of first making an extract of celery consisting of water, a fixed oil and the essential oil of a first quantity of celery, and then mixing said extract with second celery stalks and dissolving in said extract the parts of said second stalks soluble therein.

JOHN B. ROLLE.